Jan. 3, 1961   W. H. CUFFEY, JR., ET AL   2,967,010
CELLULOSIC PRODUCT

Filed March 21, 1958   3 Sheets-Sheet 1

INVENTOR
WILLIAM H. CUFFEY, JR.
CEPHAS B. SITTERSON, JR.

BY Beale and Jones

ATTORNEY

INVENTOR
WILLIAM H. CUFFEY, JR.
CEPHAS B. SITTERSON, JR.

BY Beale and Jones

ATTORNEY

INVENTOR
WILLIAM H. CUFFEY, JR.
CEPHAS B. SITTERSON, JR.

BY *Beale and Jones*

ATTORNEY

United States Patent Office 2,967,010
Patented Jan. 3, 1961

2,967,010
CELLULOSIC PRODUCT

William H. Cuffey, Jr., and Cephas B. Sitterson, Jr., Appleton, Wis., assignors to Kimberly-Clark Corporation, Neenah, Wis., a corporation of Delaware Filed Mar. 21, 1958, Ser. No. 722,905

3 Claims. (Cl. 229—51)

This invention relates to dispensing boxes or cartons which are formed with displaceable sections to provide dispensing openings.

One object of the invention is to provide an improved type of dispensing opening in a carton made of paperboard or other sheet material. Another object is to provide improved forms of perforations for forming such dispensing openings. Another object is to provide improved forms of perforations in sheet materials.

It is sometimes desirable to provide a narrow dispensing opening which extends transversely to the grain of paperboard. An example is dispensing cartons for cleansing tissues wherein the tissues are interfolded so that as each tissue is removed the next tissue is partly withdrawn. In this type of carton it is desirable that the dispensing opening be constricted so as to prevent the leading sheet from falling back into the box and to restrict the free passage of the succeeding sheets through the opening as the sheets are removed. In addition, the constricted opening serves to hold the leading tissue in a convenient position to be grasped. This may be done by removing a portion from the top side of the carton. This portion may be preformed by a pair of parallel lines of perforations extending across the carton and joined at their ends. In forming blanks for such cartons from a continuous web of paperboard, it is convenient to form the removable strips across the grain of the paperboard. However, this creates difficulties when the usual alined linear perforations are used because the bonds between adjacent perforations must be torn across the grain. The fibrous material of the carton tends to tear with the grain. If the bonds between perforations are too long, the tendency is for the removable strip to tear in two as it is being removed, or for the paperboard to tear outside the removable section. If the bonds are made short enough to minimize this difficulty, they are so weak that the removable section may be broken free prematurely during fabrication, or subsequent handling. A principal object of the present invention is to provide improved non-linear perforations so arranged that a displaceable section or a removable strip formed thereby remains securely in place during fabrication, packaging of contents, and subsequent handling, yet is cleanly and easily displaceable or removable for dispensing.

The invention is also applicable to other types of dispensing openings and provides improved kinds and arrangements of non-linear perforations for forming severance lines which are less subject to failure before severance and at the same time may be severed more easily and cleanly than perforated severance lines of the prior art.

The invention is also applicable to non-fibrous sheet materials which have a tendency to tear in one direction.

Other objects and advantages of this invention will be apparent from the following description and from the appended drawings wherein.

In the specification and claims, when referring to perforations, "linear" means "straight" and "non-linear" means "non-straight."

Figure 10:
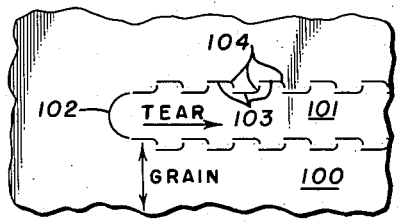
Fig. 10 is a fragmentary view showing another form of perforations according to the present invention, showing how a removable section similar to that of Fig. 2 may be formed with them.
Figure 15:
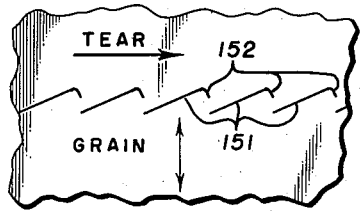
Fig. 15 is a fragmentary view of another form of perforations according to the present invention.

Applicants have found that an improved severance line can be formed transversely to the grain of sheet materials which tends to tear along the grain, such as paperboard, by a succession of elongate non-linear perforations separated by bond lines, which bond lines are approximately parallel to (within about 15 degrees from parallelism with) the grain, and by shaping the ends of the perforations so as to predispose the sheet material to sever along the successive bond lines. Both ends of the perforations are preferably so shaped, as for example in the embodiments of Figs. 3 and 12, but if desired only the tail end of each perforation need be so shaped, provided that the severance is to be made in one direction only, for example as illustrated in the embodiments of Figs. 10 and 15. Although curved and other non-linear perforations are broadly old, and although severance lines formed thereby sometimes improve the efficiency of such severance lines, the severance lines formed in accordance with the present invention give important advantages over the prior art. This is particularly true where a narrow dispensing opening must be formed across the grain, as illustrated for example in Figs. 1 and 2, but is also advantageous for forming dispensing openings of other shapes, as well as when any severance line is to be formed transversely with respect to the grain.

Figure 1:
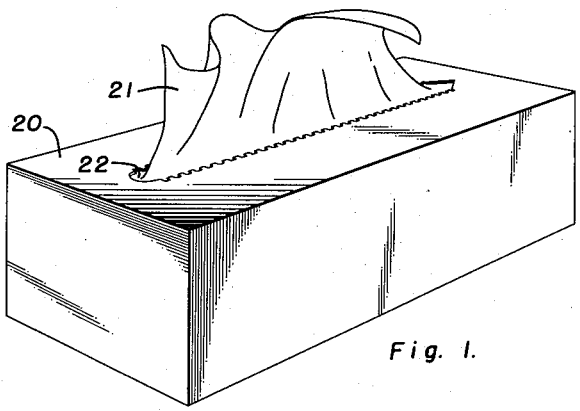
Fig. 1 is a perspective view of a carton for tissues having a dispensing opening formed in accordance with a preferred form of the invention.

Fig. 1 shows a dispensing carton 20 for dispensing interfolded sheets 21 through a constricted narrow slot 22.

Figure 2:
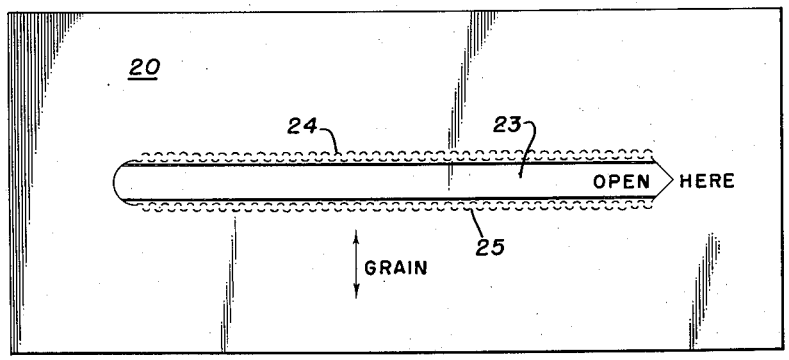
Fig. 2 is a plan view of the carton of Fig. 1 showing a long narrow removable section formed therein across the grain in accordance with the preferred form of the present invention.

As indicated in Fig. 2, this slot is formed across the grain of the paperboard of which the carton is formed by removing a section 23 of the paperboard. This section or strip is formed by perforations comprising parallel lines 24 and 25 of non-linear perforations. A portion of one such line is shown partially severed in Fig. 3, and comprises a succession of elongate non-linear perforations which are disposed in succession alternately on opposite sides of a median line defined by the line connecting the midpoints of the linear bond lines which connect the adjacent ends of successive perforations before severance. Thus, in Fig. 3, non-linear perforations have been formed in the sequence 31—36, with perforations 31, 33 and 35 above and 32, 34 and 36 below the median line through the midpoints of the linear "bond lines" 26—30 and 30' which connect the adjacent ends of successive perforations. The end portions of the perforations are shaped so as to predispose the sheet material to sever cleanly along the bond lines, which in this instance are exactly parallel with the grain. This result is obtained by shaping the adjacent ends of adjacent perforations toward each other somewhat, and preferably in a direction which tends toward parallelism with the fibers of the sheet. Thus each end of each perforation is closer to the median line than adjacent portion of said perforation.

Figure 3:
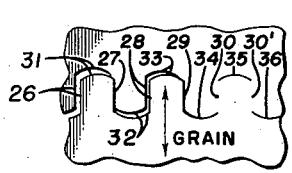
Fig. 3 is an enlarged fragmentary portion of Fig. 2 showing a portion of one line of perforations and how the carton top severs along this line when a lifting force is applied to the removable section.

Fig. 3 shows how the material severs along the successive bond lines when a separating force is applied. This force, in the embodiment of Fig. 2, is applied perpendicularly to the plane of the material, but in other embodiments may be applied in the plane of the material, i.e., as a spreading force. In either case the material severs cleanly along the successive bond lines. In Fig. 3, bond lines 26—28 have been severed, bond line 29 is being severed, and bond lines 30 and 30' have not been severed.

Figure 5:
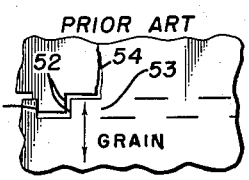
Fig. 5 is a view similar to Fig. 3 showing a comparable line of perforations from the prior art, illustrating a common type of failure which the present invention prevents.

Fig. 5 shows a comparable line of perforations according to the prior art in order to illustrate a common type of failure when the perforations are not formed in accordance with the present invention. Here, under similar conditions to that illustrated in Fig. 3, bond lines 51 and 52 have severed properly, but bond line 53 has held against severance, and the material has failed in the wrong direction from a linear perforation, as illustrated at 54.

Figure 4:
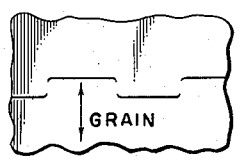
Fig. 4 is similar to Fig. 3 showing a slightly different form of perforations.
Figure 6:
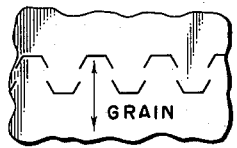
Fig. 6 is a view similar to Fig. 3 showing another form of perforations in accordance with the present invention.
Figure 7:
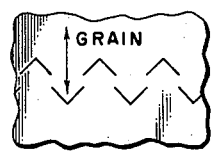
Fig. 7 is a view similar to Fig. 3 showing another form of perforations according to the present invention.
Figure 8:
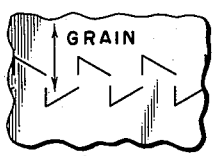
Fig. 8 is a view similar to Fig. 3 showing still another form of perforations according to the present invention.

In Fig. 3 the perforations are arcuate throughout their lengths, but this is not essential. As illustrated in Fig. 4 the perforations may be linear throughout most of their lengths, with the ends curved slightly toward the median line. Neither are arcuate end portions necessary; various angular forms are possible in accordance with the invention, for example as illustrated in Figs. 6–8. The spacing of the bond lines and the lengths thereof may vary widely, and may be selected to obtain the desired strength of the sheet against accidental severance, and the desired facility with which the sheet may be severed along the severance line.

Figure 3A:
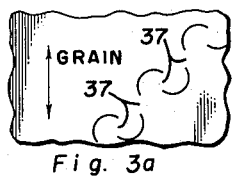
Fig. 3a shows a line of perforations similar to those illustrated in Fig. 3 but arranged to conform to a severance line which is inclined with respect to the grain.
Figure 6A:
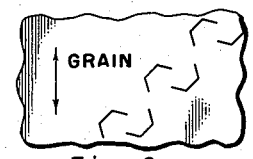
Fig. 6a is a view similar to Fig. 6 showing similar perforations arranged to conform to a severance line which is inclined to the grain.

The invention is not limited to lines of perforations which are perpendicular to the grain, but may be applied wherever the line of perforations is transverse to the grain, either along a straight line or a line which changes direction. Fig. 3a shows how a line of perforations similar to those of Fig. 3 may be used to form a severance line which extends 45 degrees to the grain. The perforations are arranged so that their adjacent end portions incline toward the median line, with the adjacent ends approximately along the same grain line, thus providing bond lines 37 lying approximately parallel with the grain. Various non-linear perforations may be adapted similarly to an inclined line of perforations. Fig. 6a shows such an adaptation of the Fig. 6 perforations.

Figure 9:
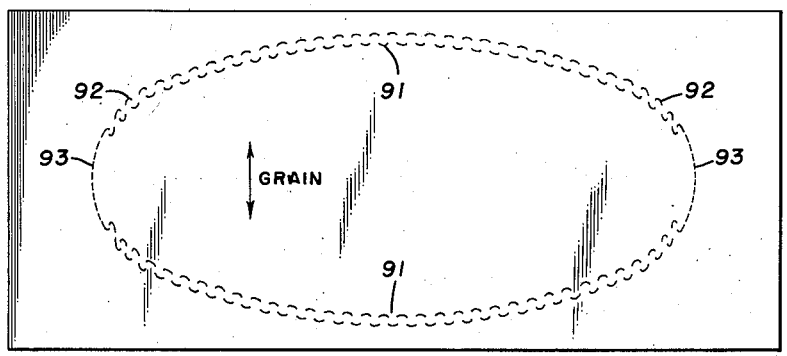
Fig. 9 shows the top of a dispensing carton having an elliptically shaped removable section formed therein and showing how perforations of the type illustrated in the preceding figures may be adapted to form the removable section.

Fig. 9 shows how perforations of the type discussed thus far can be used to form a curved removable section. At the top and bottom the severance lines are approximately perpendicular to the grain, which is vertical, and in these regions 91 the severance lines are shaped approximately like the embodiment of Fig. 3. On each side of the center the perforations become increasingly J-shaped, as at 92, to conform to the curving median line, until, near the right and left ends of the removable section, conventional spaced perforations 93 may be used because the bond lines between are close enough to parallelism to the grain to insure proper severance without uncontrolled tearing away from the severance line. Preferably, the U-shaped and J-shaped perforations are smaller and spaced more closely together in comparison to the size of the removable section than illustrated in Fig. 9, and are of a size like the perforations illustrated in Fig. 2.

It will be noted that in the embodiments described above the perforations are approximately U-shaped or J-shaped, either arcuate or angular, and are disposed in succession alternately on opposite sides of the median line connecting the midpoints of the bond lines.

When the sheet is to be torn in only one direction it is not essential that both ends of each perforation be shaped to induce tear along the grain. In Fig. 10 there is shown a portion of a removable section 101 in the top of a carton 100, similar to the removable section 23 of Fig. 2. A starting tab 102 is provided on the left end of section 101. Tab 102 is lifted and section 101 removed by tearing from left to right, as indicated by the "tear" arrow. Each of the lines of perforations defining the removable section comprises a succession of perforations in which each perforation 103 is straight except for its tail end 104 which is curved toward the straight end of the succeeding perforation, the bond lines between successive perforations being approximately parallel with the grain, as shown.

Figure 11:
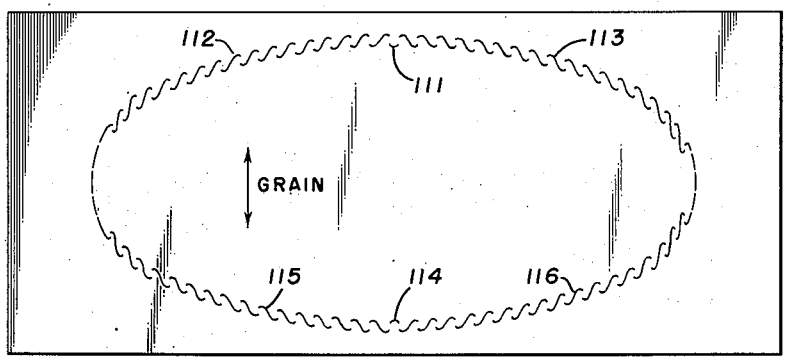
Fig. 11 is similar to Fig. 10 and shows another form of perforations in accordance with the present invention applied to an elliptical opening.
Figure 12:
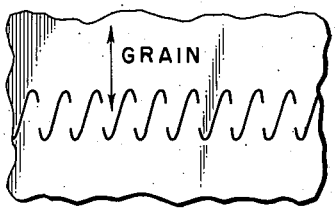
Fig. 12 is an enlarged fragmentary section of a carton showing how perforations similar to those of Fig. 11 may be used across the grain to form a removable section like that illustrated in Fig. 2.
Figure 13:
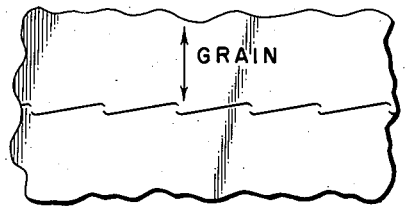
Fig. 13 is similar to Fig. 12 and shows another form of perforations in accordance with the present invention, disposed along a line which is perpendicular to the grain.
Figure 14:
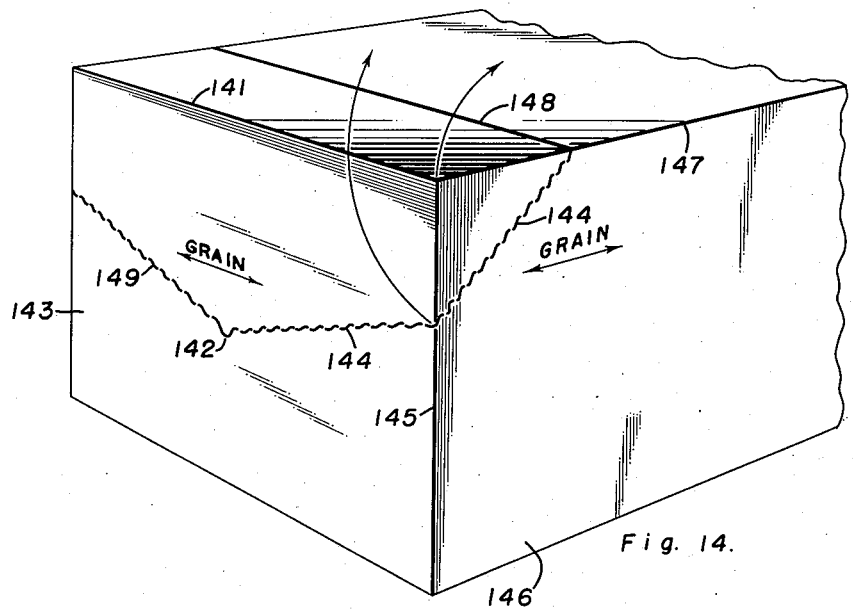
Fig. 14 is a fragmentary perspective view of one end of a dispensing carton provided with means for forming a hinged corner opening therein and illustrating an application of the present invention in forming perforated severance lines in cartons of this type.

Another type of perforation in accordance with the invention is shown in the embodiments of Figs. 11 to 15 inclusive. In this type, each perforation crosses a line connecting the midpoints of the bond lines between successive perforations. In the embodiments of Figs. 11 to 14c the perforations are approximately S-shaped, either arcuate or angular, each perforation crossing the median line connecting the midpoints of the bond lines. Figs. 12, 13, 14a, 14b, and 14c inclusive, illustrate examples of this type, and Figs. 11 and 14 illustrate applications of this type perforation in forming dispensing openings in cartons. As in the case of the approximately U-shaped perforations of Figs. 1–4 and 6–9, the adjacent ends of adjacent perforations are shaped toward each other somewhat, and preferably in a direction which tends toward parallelism with the fibers of the sheet. Thus, as in the case of the approximately U-shaped perforations, each end of each S-shaped perforation is closer to the median line than an adjacent portion of the perforation.

Referring to Fig. 11, the S-shaped form is used to form an elliptical removable section. Preferably the perforations are smaller than illustrated, and of a size like that shown in Fig. 2, but are shown here somewhat larger in order to illustrate the invention more clearly. In order to adapt the S-shaped perforations to the arcuate median line, they are oriented in opposite aspects on each side of a single U-shaped perforation on the vertical centerline. Thus, along the upper half, if the single U-shaped perforation 111 is "right side up" as illustrated, the perforations 112 to the left are S-shaped and the perforations 113 to the right are inverted S-shaped. Along the bottom, using an inverted U-shaped perforation 114 at the center, the perforations 115 to the left are inverted S-shaped, and the perforations 116 to the right are S-shaped. This arrangement makes it possible to elongate the perforations as the median line approaches parallelism with the grain. As in the embodiment of Fig. 9, conventional perforations are used at the extreme right and left sides, where the bond lines are close enough to parallelism with the grain to insure proper severance without uncontrolled tearing away from the severance line.

Figure 14A:
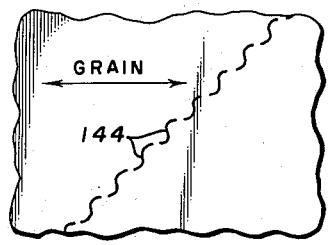
Fig. 14a is an enlarged fragmentary view of the perforations of Fig. 14, which are like those of Fig. 12, being adapted to a severance line which is inclined to the grain.
Figure 14B:
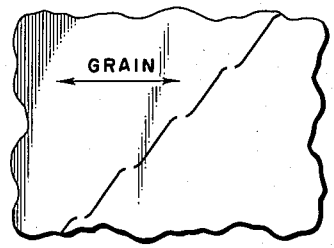
Fig. 14b is a view similar to Fig. 14a showing a form of perforations like those of Fig. 13, but inclined to the grain.
Figure 14C:
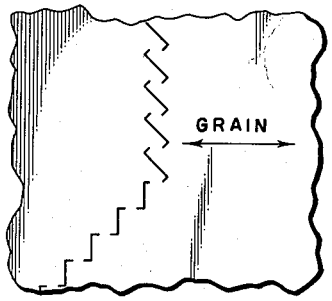
Fig. 14c is another view similar to Fig. 14a showing a similar form of perforations with a change of direction.

Figs. 12 and 13 show two forms of S-shaped perforations arranged in succession across the grain, illustrating that they may be condensed or expanded, and that the proportionate lengths of the bond lines may be varied substantially. The end portions may also be angular, as illustrated in Fig. 14c.

Fig. 14 illustrates how the S-shaped perforations may be adapted to severance lines which extend along more than one side of a carton, in this instance to a hinged corner opening around end edge 141. A suitable starting incision 142 is provided in vertical end side 143. From this S-shaped perforations 144 extend upwardly and to the right, around vertical front edge 145, along vertical front side 146 to top front edge 147 at one end of an embossed hinge line 148 which extends across the top side from front to rear. Similarly, to the left of starting incision 142, inverted S-shaped perforations 149 extend around the vertical rear side (not shown) to the opposite end of hinge line 148. As shown in Figs. 14 and 14a, the non-linear or S-shaped perforations are arranged so that the adjacent ends of adjacent perforations lie approximately along the same grain lines, i.e. the bond lines between perforations are approximately parallel with the grain. The perforations may be varied in shape, for example as illustrated in Figs. 14b and 14c. In Fig. 14b, as in Fig. 13, the perforations are straight, except for slightly turned ends. In Fig. 14c the end portions are straight, and disposed at an angle to the central portion. In all embodiments, however, the bond lines between adjacent ends are approximately parallel with the grain, as illustrated. Changes in direction of the general severance line may be made, as illustrated in Fig. 14c.

The perforations shown in Fig. 15, like those of Fig. 10 are adapted for tearing only in one direction, i.e. from left to right as indicated by the "tear" arrow. Like the perforations of Fig. 10, each of these perforations 151 is straight except for its tail end 152, which is curved toward the starting end of the succeeding perforation. As in all of the other embodiments, the bond lines between successive perforations are approximately parallel with the grain.

Paperboard is the sheet material commonly used in the embodiments described above, and the "grain" of this material, along which it tends to tear, is the direction of the parallel fibers of the material. The invention is applicable to other sheet materials which tend to tear in a definite direction, whether the material is comprised of parallel fibers or not, the "grain" in such other materials being the direction in which it tends to tear. In the description and in the claims, it is specified that the "bond line" or bond lines between successive perforations are "approximately parallel" to the grain. "Approximately" here means sufficiently close to parallelism so that the natural tendency of the material to tear along or with the "grain" is effective in causing the material to sever positively along the bond line from the tail end of one perforation to the adjacent or starting end of the succeeding perforation. The allowable variation from precise parallelism to be "approximately parallel" within the scope of the claims depends upon the particular sheet material and, to a lesser degree, upon the lengths of the bond lines. In the case of the average "paperboard" the allowable variation has been found to be about four degrees. In the case of other materials, the allowable variation may be as much as fifteen degrees. The amount of allowable variation for a particular material and length of the bond lines may easily be determined by test.

It has been found that preformed severance paths or lines formed across the grain of fibrous or other similar sheets in accordance with this invention have distinct advantages over the prior art. Since the "bond lines" along which controlled severance takes place lie along the grain, i.e. parallel to the general disposition of the fibers in fibrous sheets, the severance is cleaner, and with much less undesirable "fuzz" extending from the edges of openings formed thereby. They are easily severed upon application of force at the proper place and in the proper direction. At the same time, and quite unexpectedly, such severance paths or lines are much more resistant to accidental severance during packaging of products in, and handling of the cartons in which they are formed than is the case with alined straight perforations across the grain, or staggered straight perforations across the grain (as in Fig. 5). The reason or reasons for this unexpected result are unknown, but it is thought that the bond between adjacent linear perforations is weakened far more by a conventional straight perforating rule applied across the grain than by a shaped rule which tends to direct the tear along the grain. It is also thought possible that the laminated character of paperboard also may affect its strength (as well as its tearing characteristics). Such paperboard is made of a plurality of highly directional plies of laminated sheets held together by fiber to fiber bonds. The facing sheet is composed of longer fibers and is of higher quality than the underlying sheets. The fibers are nearly parallel throughout the thickness of the paperboard, yet there may be very slight differences in direction between layers. At any rate, there is a definite tendency for the paperboard to delaminate when it is torn in a direction transverse to the grain direction. This delaminating effect is eliminated by the present invention, but appears to be a source of weakness when straight perforating rules are applied perpendicularly to the grain, as well as increasing the tendency to tear in an undesired direction. Even a slight shaping of the ends of the perforating knife sections of a transverse perforating rule, so that these end portions incline toward the desired direction of tear seems to have a marked effect in controlling the tearing of the sheet along the desired lines between the adjacent ends of adjacent perforations.

Numerous embodiments within the scope of the claims will be apparent to those skilled in the art.

We claim:

1. An article dispensing carton having a wall formed of fibrous sheet stock, the fibers of which are disposed in a manner to define a grain direction, the tear resistance of the stock being at a minimum in said direction, said wall being provided with a path of weakening marginally to define a panel the severance of which provides a dispensing opening, said path of weakening comprising a sequence of at least three spaced non-linear perforations so positioned in respect to the grain direction that all of the shortest linear paths through the uncut stock between the ends of successive perforations in said sequence are in substantial alignment with the grain direction and in spaced parallel relation to each other, the shortest line between the successive midpoints of said shortest linear paths in said sequence being transverse to the grain direction, each end of each perforation in said sequence being closer to said shortest line than the immediately adjacent portion of said perforation, whereby the panel is severable from said wall with minimum applied force.

2. The device of claim 1 wherein said sequence of at least three spaced non-linear perforations comprises two sets of arcuate perforations disposed on opposite sides of said shortest line, the perforations in one set being disposed in respect to those of the other set to so position the ends of the perforations that the shortest paths through the intervening uncut stock between the ends of successive perforations of the weakness path are in substantial alignment with the grain of the stock.

3. The device of claim 1 wherein at least some of the perforations cross said shortest line.

References Cited in the file of this patent

UNITED STATES PATENTS

| | | |
|---|---|---|
| 751,047 | Bircher | Feb. 2, 1904 |
| 2,285,542 | Tasker | June 9, 1942 |
| 2,448,819 | Mitchell | Sept. 7, 1948 |
| 2,626,096 | Hickin | Jan. 20, 1953 |

FOREIGN PATENTS

| | | |
|---|---|---|
| 8,129 | Switzerland | Feb. 27, 1894 |
| 196,035 | Switzerland | May 16, 1938 |